March 13, 1956 J. E. HOGAN 2,737,697
CONNECTORS FOR JET ENGINE BLANKETS
Filed Jan. 17, 1952

INVENTOR.
JOHN E. HOGAN
BY
ATTORNEYS

12
United States Patent Office 2,737,697
Patented Mar. 13, 1956

2,737,697

CONNECTORS FOR JET ENGINE BLANKETS

John E. Hogan, Los Angeles, Calif., assignor to Clark Hartwell and Eleanor M. Hartwell, both of Los Angeles, Calif., copartners doing business as Hartwell Aviation Supply Company, Los Angeles, Calif.

Application January 17, 1952, Serial No. 266,965

6 Claims. (Cl. 24—19)

My invention relates to connectors for jet engine blankets, that is, to connecting devices for securing together the confronting ends of an insulating blanket wrapped about the after burner or exhaust cone or other cylindrical or conical section of a jet engine. Citing by way of example, the exhaust cone of a jet engine is mounted within but spaced from the walls of a shell forming the external streamlined surface at the discharge end of a jet engine. Because of the intense heat generated by a jet engine, insulation blankets which are formed of stainless steel foil filled with an asbestos padding are used. These must be replaced frequently.

Heretofore, the confronting ends of the blanket have been laced together with wire. In order to do this, it is necessary in many cases to remove the outer shell. This involves considerable labor. Attempts have been made to provide a removable access panel at the top, bottom or side of the shell so that the old blanket could be withdrawn and a new blanket threaded into place through the annular passage formed between the exhaust cone and the shell. This would be satisfactory except for the fact that lacing of the confronting ends of the blanket is particularly tedious inasmuch as this must be done through the limited space provided by the access panel. Furthermore, at best, wire lacing of the blanket is not satisfactory for the reason that an exhaust cone on heating may expand in circumference as much as three-quarters of an inch. The lacing is not yieldable, and therefore, the blanket must yield or tear.

Bearing the problem in mind, as outlined above, the objects of my invention are:

First, to provide a connector for jet engine blankets which may be readily attached to the confronting ends of such blanket and easily manipulated even in difficult or cramped quarters to draw the ends of the blanket together.

Second, to provide a connector for jet engine blankets which affords yieldable connection between the ends of the blanket so as to maintain the blanket in position and permit expansion and contraction without subjecting the blanket to excessive tensional loads.

Third, to provide a connector for jet engine blankets which is particularly economical to manufacture so that the connector may be expendable, that is, used only once or twice and replaced.

Fourth, to provide a connector for jet engine blankets which is particularly compact so as to fit readily and follow the arcuate contour of the exhaust cone and its surrounding shell.

With the above and other objects in view as may appear hereinafter, reference is directed to the accompanying drawings, in which.

Figure 1:
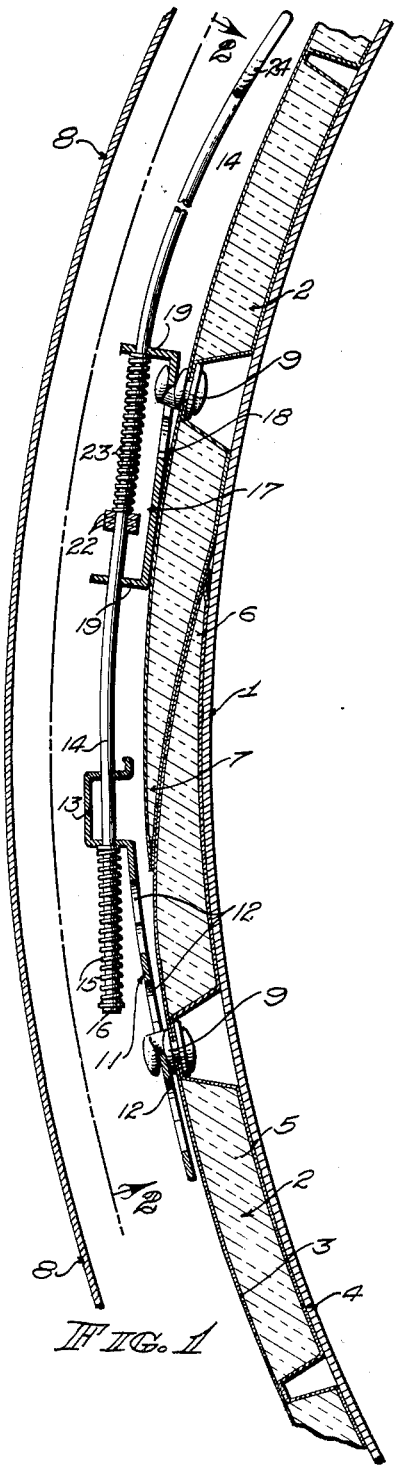
Figure 1 is a fragmentary sectional view of the after burner or exhaust cone of a jet engine illustrating the surrounding shell and adjacent ends of an insulating blanket with my connector shown in place, partially in elevation and partially in section.
Figure 2:
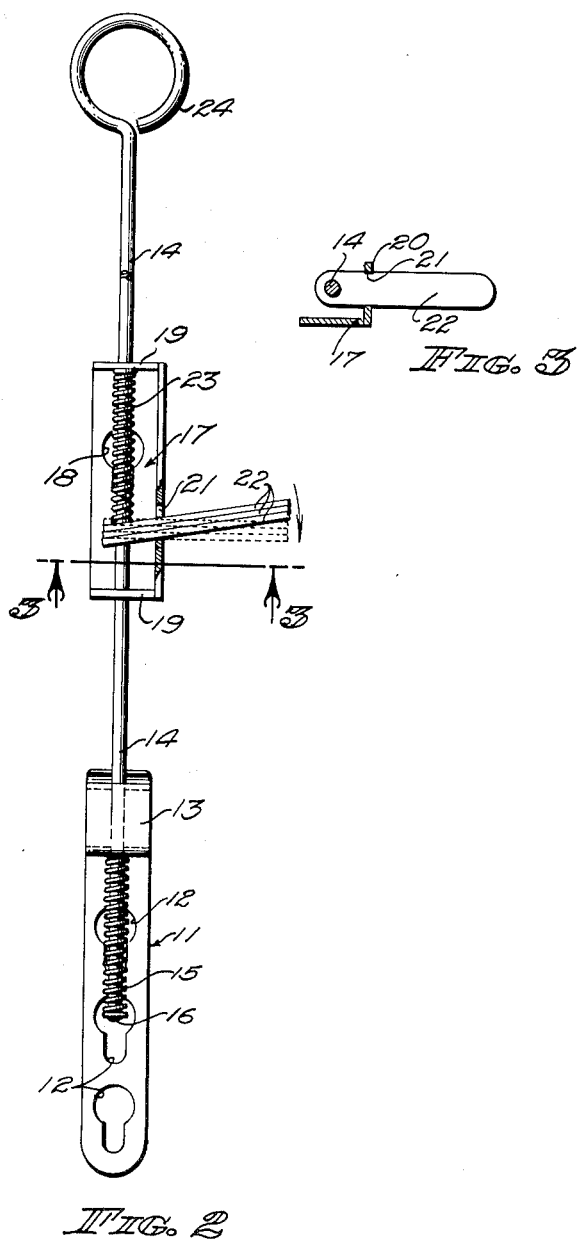
Figure 2 is a plan view of my connector taken substantially along the line 2—2 of Figure 1.
Figure 3:
Figure 3 is a transverse sectional view through 3—3 of Figure 2.

With reference to the drawings, Figure 1 illustrates fragmentarily an exhaust cone 1 of a jet engine. Wrapped about the exhaust cone is a blanket 2, comprising outer and inner stainless steel foil skins 3 and 4 between which is provided abestos padding 5. To prevent shifting of the asbestos padding and to provide the necessary flexibility so that it may be wrapped about and adapted to the contour of a conical surface, the inner and outer skins are joined together at intervals to divide the asbestos padding into narrow strips or sections. The ends of the blanket are preferably tapered as indicated by 6 and 7 and are arranged to overlap. The exhaust cone is enclosed in an outer shell 8 spaced from the outer surface of the blanket 2.

In the exercise of my invention, I provide adjacent the tapered ends 6 and 7, mating pairs of anchor hooks 9. These may be in the form of rivets with outwardly projecting flat hook portions.

The mating pairs of anchor hooks 9 are joined together by a plurality of my connectors. Each connector includes a bracket 11 in the form of a sheet metal strip. The bracket is provided with a series of eyelets 12, each enlarged at one end to fit over an anchor hook. One end of the bracket is bent to form a transverse channel 13 having parallel flanges in which are punched aligned openings which function as slide bearings for a pull rod 14 threaded therethrough. One end of the pull rod 14 is provided with a compression spring 15 which is restrained by an enlargement 15 in the extremity of the pull rod. The other end of the spring 15 bears against the side of the transverse channel portion 13.

A second bracket 17 is provided in which is formed one or more eyelets 18 to hook over the mating anchor hook 9. The extremities of the bracket are turned outwardly and perforated to form guide ends 19 through which is threaded the pull rod 14. The bracket 17 is also provided with a side wall 20 having a slot 21 therein through which extend one or more locking levers 22. The locking levers are perforated to fit slidably on the pull rod 14 but are capable of binding when disposed angularly. A spring 23 bears against the locking levers 22 and the guide end 19 remote from the bracket 11. The spring tends to force the locking levers into angular relation with the pull rod due to the fact that the locking levers fulcrum over a margin of the slot 21. By pressing on the extended portions of the locking levers in opposition to the force of the spring 23, the locking levers are held normal to the axis of the pull rod so that the pull rod may be released. The pull rod projects beyond the bracket 17 and is provided with a finger loop 24.

Operation of my connector is as follows: The blanket is fitted into place and the brackets 11 and 17 are fittted over their respective anchor hooks 9. While holding the bracket 17 with one hand, the pull rod is drawn through this bracket, pulling the two ends of the blanket together and compressing the spring 15. The pull rod is drawn until the desired degree of compression in the spring 15 is attained, whereupon the pull rod may be released, causing the locking levers 22 to grip and bind the pull rod against return movement. When it is desired to remove the connector, it is merely necessary to press on the locking levers until the pull rod is released. The connector may then be removed.

It will be observed that the pull rod may be bent to conform to the arcuate contour of the blanket, and after burner, so as to fit within the annular space provided between the after burner and the surrounding shell. While the pull rod may be given a permanent arcuate curvature, it may be made, however, of steel, preferably stainless steel, sufficiently ductile that it may be bent manually in the course of installing the connector.

Having fully described my invention, it is to be understood that I do not wish to be limited to the details herein set forth, but my invention is of the full scope of the appended claims.

I claim:

1. In a jet engine wherein a blanket is interposed between a jet engine and a surrounding shell, and wherein the blanket is divided longitudinally to form circumferentially overlapping ends and provided with pairs of cooperating anchoring devices, the combination of a connecting device, comprising: a bracket for removable attachment to each of a pair of said anchoring devices; a pull rod threaded through said brackets; a spring carried by said pull rod and engaging one of said brackets to resist movement of said pull rod therethrough; and a readily releasable locking means carried by the other of said brackets for engaging said pull rod to prevent back movement of said pull rod therethrough under urge of said spring.

2. In a jet engine wherein a blanket is interposed between a jet engine and a surrounding shell, and wherein the blanket is divided longitudinally to form circumferentially overlapping ends and provided with pairs of cooperating anchoring devices, the combination of a connecting device, comprising: a bracket for removable attachment to each of a pair of said anchoring devices; a pull rod for drawing said brackets together; yieldable means interposed between said pull rod and one of said brackets; and a readily releasable adjustable locking means between said pull rod and the other of said brackets.

3. In a jet engine wherein a blanket is interposed between a jet engine and a surrounding shell, and wherein the blanket is divided longitudinally to form circumferentially overlapping ends and provided with pairs of cooperating anchoring devices, the combination of a connecting device, comprising: a bracket removably attachable to each of said anchoring devices, said brackets being disposed in normal angular relation with each other; a bendable pull rod threaded through both of said brackets and adapted to extend circumferentially of said blanket; a spring carried by said pull rod and engaging one of said brackets to resist movement of said pull rod therethrough; and a readily releasable locking means carried by the other of said brackets for engaging said pull rod to prevent back movement of said pull rod therethrough under urge of said spring.

4. In a jet engine wherein a blanket is interposed between a jet engine and a surrounding shell, and wherein the blanket is divided longitudinally to form circumferentially overlapping ends and provided with pairs of cooperating anchoring devices, the combination of a connecting device, comprising: a bracket removably attachable to each of said anchor means, said brackets being disposed in normal angular relation with each other; a bendable pull rod threaded through both of said brackets and adapted to extend circumferentially of said blanket; yieldable means interposed between said pull rod and one of said brackets; and a readily releasable adjustable locking means between said pull rod and the other of said brackets.

5. In a jet engine wherein a blanket is interposed between a jet engine and a surrounding shell, and wherein the blanket is divided longitudinally to form circumferentially overlapping ends and provided with pairs of cooperating anchoring devices, the combination of a connecting device, comprising a bracket for removable attachment to each of a pair of said anchoring devices; a pull rod threaded through said brackets; a readily releasable locking member carried by one of said brackets and slidable on said pull rod and adapted to bind thereon when angularly displaced to restrain said pull rod relative to said bracket; and a yieldable connection between said pull rod and the other of said brackets.

6. In a jet engine wherein a blanket is interposed between a jet engine and a surrounding shell, and wherein the blanket is divided longitudinally to form circumferentially overlapping ends and provided with pairs of cooperating anchoring devices, the combination of a connecting device, comprising: a bracket removably attachable to each of said anchoring devices, said brackets being disposed in nominal angular relation with each other; a bendable pull rod threaded through both of said brackets and adapted to extend circumferentially of said blanket; a readily releasable locking member carried by one of said brackets and slidable on said pull rod and adapted to bind thereon when angularly displaced to restrain said pull rod relative to said bracket; and a yieldable connection between said pull rod and the other of said brackets.

References Cited in the file of this patent

UNITED STATES PATENTS

| Number | Name | Date |
|---|---|---|
| 847,421 | Marggraff | Mar. 19, 1907 |
| 1,501,789 | Lindell | July 15, 1924 |
| 1,647,938 | Seguin | Nov. 1, 1927 |
| 2,284,314 | Wetzler | May 26, 1942 |

FOREIGN PATENTS

| Number | Country | Date |
|---|---|---|
| 111,513 | Sweden | Aug. 15, 1944 |
| 490,095 | Germany | Jan. 25, 1930 |